(12) United States Patent
Tensing et al.

(10) Patent No.: US 10,767,411 B2
(45) Date of Patent: Sep. 8, 2020

(54) METHOD AND DEVICE FOR AUTOMATICALLY CLOSING A TAILGATE OF A MOTOR VEHICLE

(71) Applicant: Ford Global Technologies, LLC, Dearborn, MI (US)

(72) Inventors: Matthias Tensing, Cologne (DE); Jan Zacharias, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 230 days.

(21) Appl. No.: 16/007,083

(22) Filed: Jun. 13, 2018

(65) Prior Publication Data

US 2018/0363350 A1 Dec. 20, 2018

(30) Foreign Application Priority Data

Jun. 16, 2017 (DE) .......................... 10 2017 210 122

(51) Int. Cl.
*E06B 7/00* (2006.01)
*E05F 5/02* (2006.01)
(Continued)

(52) U.S. Cl.
CPC ............ *E05F 5/025* (2013.01); *E05F 1/1091* (2013.01); *E05F 5/022* (2013.01); *E05F 15/00* (2013.01);
(Continued)

(58) Field of Classification Search
CPC . E05F 15/50; E05F 5/025; E05F 15/53; E05F 15/00; E05F 1/1091; E05F 1/10;
(Continued)

(56) References Cited

U.S. PATENT DOCUMENTS 5,588,258 A * 12/1996 Wright .................. E05F 15/627
49/340
6,092,336 A 7/2000 Wright et al.
(Continued)

FOREIGN PATENT DOCUMENTS

EP 1449697 B1 8/2004
WO 0183924 A 11/2001
WO 2016017310 A1 2/2016

*Primary Examiner* — Chi Q Nguyen
(74) *Attorney, Agent, or Firm* — David Coppiellie; Price Heneveld LLP

(57) ABSTRACT

A device and method for automatically closing a tailgate of a motor vehicle having a body and a tailgate closing device, is described. The tailgate closing device comprises first and second closing elements. A suspension strut is situated on a first side of the tailgate and a power strut is situated on a second side of the tailgate opposite the first side. The suspension strut and the power strut are both connected to the tailgate and to the body. The first closing element is situated on the tailgate and the second closing element is situated on the body. The first and second closing elements are designed to engage into each other during the closing of the tailgate to effectuate the closure of the tailgate. The torque acting via the power strut onto the tailgate is reduced during the closing of the tailgate when the distance between the first and second closing elements is less than a threshold value.

20 Claims, 2 Drawing Sheets

(51) Int. Cl.
*E05F 15/00* (2015.01)
*E05F 15/611* (2015.01)
*E05F 1/10* (2006.01)
*B60J 5/10* (2006.01)
*E05F 15/53* (2015.01)
*E05F 15/622* (2015.01)

(52) U.S. Cl.
CPC .......... *E05F 15/611* (2015.01); *B60J 5/106* (2013.01); *E05F 15/53* (2015.01); *E05F 15/622* (2015.01); *E05Y 2201/22* (2013.01); *E05Y 2201/25* (2013.01); *E05Y 2201/41* (2013.01); *E05Y 2201/42* (2013.01); *E05Y 2400/30* (2013.01); *E05Y 2400/31* (2013.01); *E05Y 2900/546* (2013.01)

(58) Field of Classification Search
CPC .......... E05F 15/611; E05Y 2900/546; E05Y 2201/41; E05Y 2201/25; E05Y 2201/42; E05Y 2400/30; E05Y 2400/31; E05Y 2400/00; B60J 5/106
USPC .............. 49/70, 340, 343, 52, 349, 56, 341; 318/432, 433
See application file for complete search history.

(56) References Cited

U.S. PATENT DOCUMENTS

| | | | |
|---|---|---|---|
| 6,298,604 B1* | 10/2001 | Rogers, Jr. ........... | B62D 25/105 296/106 |
| 6,719,356 B2 | 4/2004 | Cleland et al. | |
| 7,070,226 B2* | 7/2006 | Cleland ................. | E05F 1/1091 296/146.8 |
| 7,547,058 B2* | 6/2009 | King ....................... | B60J 5/101 296/146.8 |
| 7,637,057 B2* | 12/2009 | Matsui ................. | E05F 15/611 49/345 |
| 8,103,416 B2 | 1/2012 | Frommer et al. | |
| 8,469,439 B2* | 6/2013 | Kishino ................... | B60J 5/10 296/146.9 |
| 8,875,442 B2* | 11/2014 | Sohn ....................... | E05F 15/70 49/138 |
| 8,944,487 B2* | 2/2015 | Yuge ....................... | E05F 15/63 16/79 |
| 10,094,159 B2* | 10/2018 | Grudzinski ........... | E05F 15/622 |
| 2005/0039404 A1 | 2/2005 | Mrkovic et al. | |
| 2007/0261306 A1* | 11/2007 | Hanna .................... | E05F 15/622 49/52 |
| 2007/0261310 A1* | 11/2007 | Porat ..................... | E05F 1/1091 49/340 |
| 2008/0197652 A1* | 8/2008 | Stratten ................. | B62D 33/03 296/57.1 |
| 2008/0276537 A1* | 11/2008 | Hanna ................... | E05F 15/622 49/343 |

* cited by examiner

METHOD AND DEVICE FOR AUTOMATICALLY CLOSING A TAILGATE OF A MOTOR VEHICLE

FIELD OF THE INVENTION

The present invention generally relates to vehicle tailgates, and more particularly relates to a device and method for automatically closing a tailgate of a motor vehicle.

BACKGROUND OF THE INVENTION

Motor vehicle tailgates designed to be automatically actuated are typically configured in such a way that one single power strut is usually situated on one side of the tailgate and a suspension strut is situated on the other side of the tailgate. Such systems typically have the disadvantage that the tailgate is twisted due to different torques on the two sides of the tailgate. As a result of this twisting, an offset is generally induced when the components of the closing mechanism engage into each other. The offset between the first closing element and the second closing element can be up to 7.5 mm. An offset in this order of magnitude is undesirable. This offset prevents the elements of the closing mechanism from engaging into each other for proper functioning and has the result that a closing of the tailgate may not be possible or the closing mechanism is subject to greater wear and stress. As a result of the offset, there is also the risk of the tailgate springing back during the closing procedure.

A system and a method for the dynamic braking of a tailgate closing system are disclosed, for example, in U.S. Pat. No. 8,103,416 B2. Yet another system for controlling an automatic actuation of a tailgate is disclosed in U.S. Pat. No. 6,719,356 B2, wherein two power struts are utilized, one on each side of the tailgate. The problem of the twisting of the tailgate therefore may not even occur in this case. Further variants for the automatic opening and closing of vehicle doors and, in particular, tailgates, are disclosed in U.S. Pat. No. 6,092,336, WO 01/83924 A1, and U.S. Patent Application Publication No. 2005/0039404 A1. None of the above-identified documents adequately address the problem of the offset of the closing mechanism occurring during automatic closing when only one power strut is utilized.

It would be desirable to provide for an advantageous method for automatically closing a tailgate of a motor vehicle and an advantageous device for automatically closing the tailgate.

SUMMARY OF THE INVENTION

According to one aspect of the present invention, a device for automatically closing a tailgate of a vehicle is provided. The device for automatically closing a tailgate of a vehicle includes a suspension strut and a power strut arranged on opposite first and second sides of the tailgate, a tailgate closing device comprising first and second closing elements on the tailgate and a vehicle body that engage during closing of the tailgate, and a controller configured to reduce torque acting via the power strut onto the tailgate during the closing of the tailgate.

According to another aspect of the present invention, a motor vehicle is provided. The motor vehicle includes a tailgate, a body, and a device for automatically closing a tailgate of a motor vehicle. The devices includes a suspension strut and a power strut arranged on opposite first and second sides of the tailgate, a tailgate closing device comprising first and second closing elements on the tailgate and a vehicle body that engage during closing of the tailgate, and a controller configured to reduce torque acting via the power strut onto the tailgate during the closing of the tailgate.

According to a further aspect of the present invention, a method for automatically closing a tailgate of a motor vehicle is provided that includes a body and a tailgate closing device is provided. The tailgate closing device comprises providing the tailgate closing device with a first closing element situated on the tailgate and a second closing element situated on the body of the motor vehicle, first and second closing element comprising providing a suspension strut is situated on a first side of the tailgate and a power strut is situated on a second side of the tailgate, which is opposite the first side, wherein the suspension strut and the power strut are both connected to the tailgate and to the body, engaging the first closing element and the second closing element into each other during the closing of the tailgate to effectuate the closure of the tailgate, and reducing the torque acting via the power strut onto the tailgate during the closing of the tailgate when a distance between the first closing element and the second closing element is less than a threshold value.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
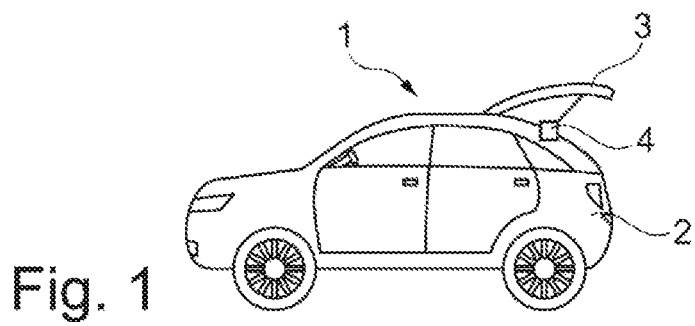
FIG. 1 is a side view of a motor vehicle having a tailgate shown in the open position and a device for closing the tailgate, according to one embodiment.

FIG. 1 schematically shows a motor vehicle 1 according to one embodiment. The motor vehicle 1 shown in FIG. 1, comprises a body 2, a tailgate 3, and a device 4 according to one embodiment for automatically closing the tailgate 3. The tailgate 3 is pivotably connected to the vehicle body 2 at the rear end of the vehicle 1 and is shown as the upward open position.

Figure 2:
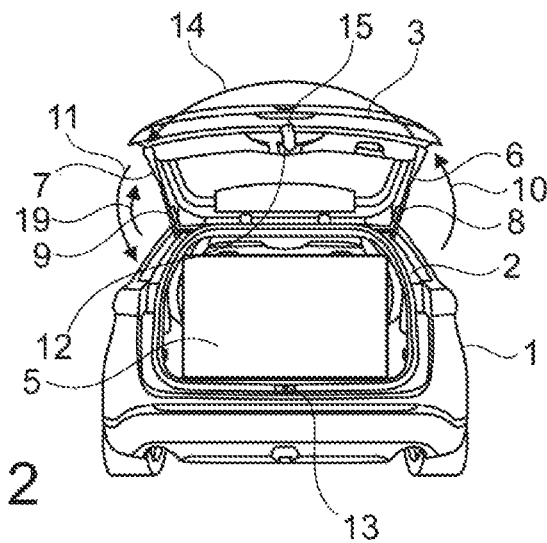
FIG. 2 is a rear view of the motor vehicle shown in FIG. 1, the torques occurring during the closing procedure.

FIG. 2 schematically shows the motor vehicle 1 from a rear view and the torques occurring during the closing procedure. The vehicle 1 is shown in a perspective view from the rear in this case. The vehicle 1 comprises a luggage compartment 5 which can be closed with the aid of the tailgate 3. The tailgate 3 is shown in the opened state.

A suspension strut 8 is situated on a first side 6 of the tailgate 3. The suspension strut 8 is connected, on the one hand, to the tailgate 3 on the first side 6 or is fastened to the tailgate 3. Moreover, the suspension strut 8 is fastened to the body 2, preferably at a position on a first side of the luggage compartment 5. Moreover, a power strut 9 is situated on a second side 7 of the tailgate 3, which is opposite the first side 6. The power strut 9 is fastened, on the one hand, to the tailgate 3 and, on the other hand, to the body 2, preferably being situated or fastened at a position on a second side of the luggage compartment 5, which is opposite the first side of the luggage compartment.

Moreover, the motor vehicle 1 comprises a closing device for closing the luggage compartment 5 with the aid of the tailgate 3 by closing the tailgate 3. The closing device comprises a first closing element 13, which is situated on the body 2 in the area of the luggage compartment 5, and a second closing element 12 which is situated on the tailgate 3. The first closing element 13 and the second closing element 12 are designed to engage into each other during the closing of the tailgate 3 and to close the tailgate 3 or effectuate the closure of the tailgate 3.

During the automatic opening of the tailgate 3, a torque 10 is applied onto the tailgate 3 via the suspension strut 8 on the first side 6 of the tailgate 3. Moreover, a torque 19 corresponding to the torque 10 is applied, via the power strut 9 on the second side 7 of the tailgate 3, onto the tailgate 3 during the opening of the tailgate 3.

During the closing of the tailgate 3, the torque 10 applied by the suspension strut 8 continues to act on the first side 6 of the tailgate 3. A torque indicated by an arrow 11 acts on the second side 7 of the tailgate 3 via the power strut 9 during the closing of the tailgate 3. Since the torques 10 and 11 are directed opposite each other during the closing of the tailgate 3, the tailgate 3 is twisted during closing. This is indicated by an arrow 14. Due to this twisting 14, the closing element 12 situated on the tailgate 3 is also twisted relative to the closing element 13 situated on the body. This is indicated by an arrow 15.

Figure 3:
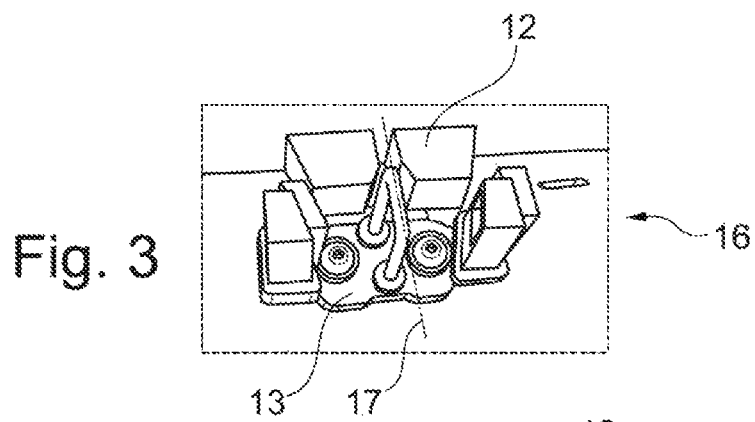
FIG. 3 is an enlarged perspective view of the closing device during a manual closing of the tailgate.

FIG. 3 schematically shows the closing device 16 during a manual closing of the tailgate 3. The second closing element 12 engages into the first closing element 13 in this case, in order to close the tailgate 3. In FIG. 3, the first closing element 13 and the second closing element 12 are oriented symmetrically with respect to each other. This is indicated by the axis of symmetry 17. In other words, in the case shown in FIG. 3, the axis of symmetry of the first closing element 13 corresponds to the axis of symmetry of the second closing element 12 during the closing procedure.

Figure 4:
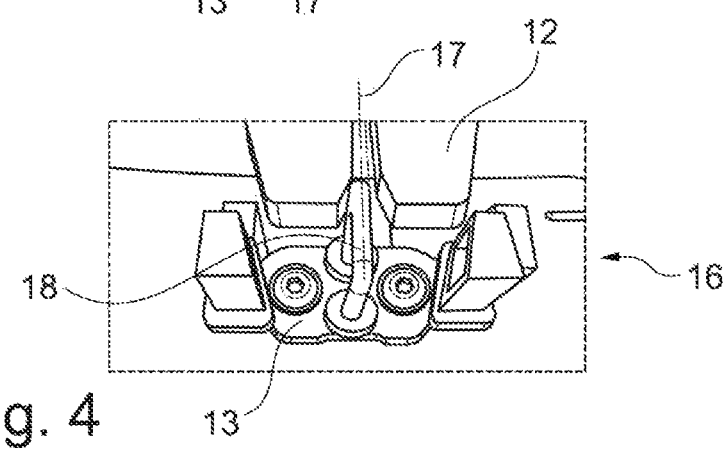
FIG. 4 is an enlarged perspective view of the closing device during an automatic closing of the tailgate.

In FIG. 4, the closing device 16 is shown in a perspective view during an automatic closing of the tailgate 3. In this case, the axis of symmetry of the second closing element 12 is indicated by the reference sign 17 and the axis of symmetry of the first closing element 13 is indicated by the reference sign 18. Due to the twisting 14 of the tailgate 3 during the closing procedure, the central axes 17 and 18 are offset with respect to each other. In other words, an offset arises between the first and the second closing elements. This offset is undesirable and is reduced or, preferably, completely avoided, by way of the device and method shown and described herein.

In the variant of the closing device 16 shown in FIGS. 3 and 4, the first closing element 13 is designed in the form of a latch plate and the second closing element 12 is designed in the form of a fishmouth. Alternative embodiments are possible.

During the opening of the tailgate 3, a first torque can be applied onto the tailgate 3 by means of the suspension strut, for example, while a second torque is simultaneously applied by the power strut. During the closing procedure, the first torque of the suspension strut continues to act, while a third torque of the power strut simultaneously acts in the opposite direction. The offset shown in FIG. 4 is effectuated as a result of the difference between the first and the third torques. A reduction of the offset can be achieved, for example, by utilizing a suspension strut 8 having a lesser torque.

Within the scope of the method according to the present disclosure, in order to avoid or at least reduce the offset, the torque of the power strut is reducing during the closing operation as soon as a threshold distance between the first closing element and the second closing element is fallen below. The threshold distance can be 100 mm, advantageously 70 mm, preferably 40 mm. Due to the reduction of the torque applied by the power strut, the previous twisting of the tailgate 3 is equalized or balanced out again, shortly before the closing elements engage into each other.

Figure 5:
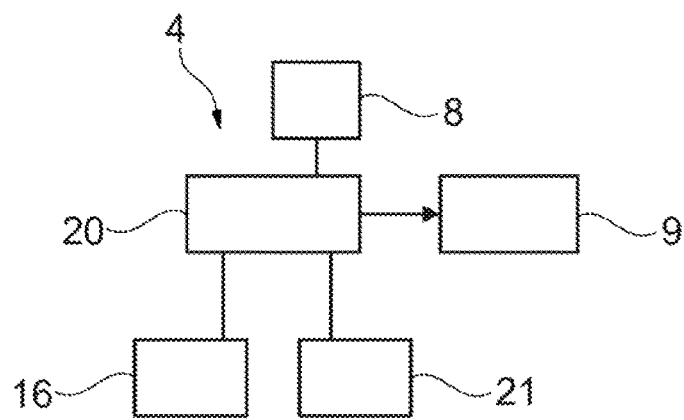
FIG. 5 is a block diagram of the device according to one embodiment for automatically closing a tailgate.

FIG. 5 schematically shows one variant embodiment of the device according to one embodiment for closing a tailgate 3 of a motor vehicle 1. The device 4 comprises a suspension strut 8 and a power strut 9. The suspension strut 8 and the power strut 9 are designed to be fastened to a tailgate 3 and a body 2 of a motor vehicle 1, as described in conjunction with FIG. 2. Moreover, the device 4 comprises a controller 20. The controller 20 is configured or designed, in particular, to control or regulate, in particular, the torque applied by the power strut 9 onto the tailgate. The device 4 also comprises a closing device 16. The closing device 16 can be designed, for example, as shown in FIGS. 3 and 4. The closing device can be situated or fastened on a motor vehicle 1 as described in conjunction with FIG. 2. Moreover, the device 4 comprises a device 21 for determining the distance between the first closing element 13 and the second closing element 12 of the closing device 16.

The device 4 is designed to reduce the torque applied by the power strut 9 onto the tailgate during the closing of a tailgate when the distance between the first closing element 13 and the second closing element 12, which is determined by the device 21, is less than a threshold value. The threshold value can be established, for example, as a distance of 100 mm, advantageously as a threshold value of 70 mm and, preferably, as a threshold value of 40 mm. The device 4 can be designed, in particular, to reduce the torque applied by the power strut onto the tailgate during the closing of the tailgate by 90% to 100%, for example up to 0 Nm. The reduction of the torque is initiated, in this case, by the controller 20.

Figure 6:
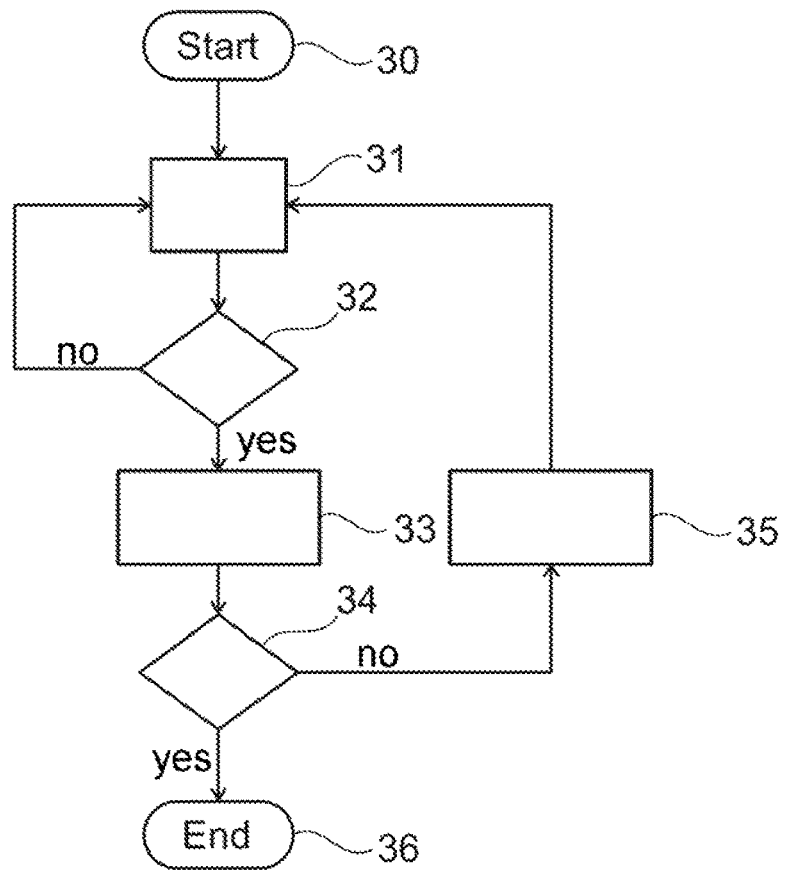
FIG. 6 is a flow chart of the method for automatically closing the tailgate, according to one embodiment.

FIG. 6 schematically shows one variant of the method of automatically closing the tailgate according to one embodiment, in the form of a flow chart. The method begins in step 30 which indicates the start of the method. In step 31, the closing procedure of the tailgate 3 is started. In step 32, a check is carried out to determine whether the distance between the first closing element 13 and the second closing element 12 falls below an established threshold value, for example 100 mm, in particular 70 mm or, preferably 40 mm.

If this is not the case, the method is continued in step 31. If this is the case, the torque applied by the power strut 9 is reduced, in step 33. The torque can be reduced by 90% to 100%, for example to 0 Nm to 15 Nm. Subsequent thereto, a check is carried out in step 34 to determine whether the closing operation has been successfully completed.

If this is the case, the method ends in step 36. If this is not the case, the closing operation is repeated, starting in step 31. Before the method is repeated, the modifications to be implemented in the repetition of the method are established in step 35. It can be established, for example, that the threshold value of the distance between the first and the second closing elements will be increased. Alternatively or additionally thereto, it can be established that the torque of the power strut 9 will be reduced by a greater extent. In this way, the method can be successively adapted to the present circumstances, for example also to the situation in which the motor vehicle 1 is in an inclined position, which affects the torques acting on the tailgate 3. In yet another variant, the threshold value of the distance between the first closing element 13 and the second closing element 12 can be indicated as a portion of the entire closing travel of the tailgate 3 in the area of the closing device, in percent. In this case, the torque of the power strut 9 is preferably reduced when the tailgate 3 has reached or exceeded the final 10%, preferably 5% of the closing travel.

According to an aspect of the present disclosure, the method for automatically closing a tailgate of a motor vehicle relates to a motor vehicle which comprises a body, a tailgate, and a tailgate closing device. The tailgate closing device comprises a first closing element and a second closing element. The first closing element is situated on the tailgate. The second closing element is situated on the body of the motor vehicle. The first closing element and the second closing element are designed to engage into each other during the closing of the tailgate and to effectuate the closure of the tailgate.

A suspension strut is situated on a first side of the tailgate. A power strut is situated on a second side of the tailgate, which is opposite the first side of the tailgate. The suspension strut and the power strut are both connected to the tailgate and to the body. Within the scope of the method, the torque applied by the power strut and acting on the tailgate is reduced during the closing of the tailgate when the distance between the first closing element and the second closing element is less than a threshold value.

In particular, the torque applied by the power strut and acting on the tailgate is reduced during the closing of the tailgate when the distance between the first closing element and the second closing element is less than 100 millimeters (100 mm), for example less than 70 millimeters (70 mm), advantageously when the distance is less than 40 millimeters (40 mm).

The method according to the present disclosure has the advantage that, due to the reduction of the torque acting on the tailgate via the power strut shortly before the final closing of the tailgate, the above-described twisting of the tailgate during the closing procedure is reduced and may be eliminated. As a result, the above-described offset of the closing elements with respect to each other is likewise reduced and may be avoided. This, in turn, prevents an undesirable wear of the closing elements and avoids an insufficient closing of the tailgate or a springing-back of the tailgate.

Within the scope of the present disclosure, the suspension strut has the task of assisting the opening process of the tailgate. The power strut provides the energy for opening and closing the tailgate. Preferably, the kinetic energy of the tailgate is utilized in addition to the torque applied by the power strut or exclusively for the last portion of the travel of the tailgate up to the complete closing.

In one advantageous variant, the torque applied by the power strut and acting on the tailgate is reduced during the closing of the tailgate up to 0 newton meters, for example up to 0 newton meters (0 Nm) to 15 newton meters (15 Nm). Preferably, the torque applied by the power strut and acting on the tailgate is reduced during the closing of the tailgate by 90% to 100%, in other words, to 0% to 10% of the torque applied at the beginning of the closing procedure. In this way, the difference of the torque acting on both sides of the tailgate is reduced and, advantageously, is equalized.

If the closing procedure could not be completed, for example due to an insufficiently reduced offset of the closing elements with respect to each other, in one advantageous variant of the method, the closing of the tailgate is repeated, whereby the torque acting via the power strut on the tailgate is reduced by a greater extent than in the preceding closing procedure. Additionally or alternatively thereto, the distance between the first closing element and the second closing element can be increased as compared to the preceding closing procedure, in which the torque acting on the tailgate via the power strut is reduced. The closing procedure can therefore be repeated multiple times.

The device for automatically closing a tailgate of a motor vehicle comprises a suspension strut, a power strut, a closing device, and a controller. The suspension strut is designed to be fastened, on a first side of the tailgate, to the body of the motor vehicle. The power strut is designed to be fastened to a second side of the tailgate, which is opposite the first side, and to the body of the motor vehicle.

The closing device comprises a first closing element which is designed to be arranged on the tailgate, and a second closing element which is designed to be arranged on the body. The first closing element and the second closing element are designed to engage into each other during the closing of the tailgate and to effectuate the closure of the tailgate.

The controller is designed to reduce the torque applied by the power strut and acting on the tailgate during the closing of the tailgate as soon as the distance between the first closing element and the second closing element is less than a threshold value, advantageously less than 100 millimeters (100 mm), for example less than 70 millimeters (70 mm), preferably less than 40 millimeters (40 mm). The device is suitable and designed, in principle, to carry out the above-described method according to the invention. The device may have the same properties and advantages of the above-described method. The controller can be designed, in particular, to reduce the torque applied by the power strut and acting on the tailgate during the closing of the tailgate by 90% to 100%, for example up to 0 newton meters (0 Nm).

Moreover, the controller can be designed to repeat the closing procedure of the tailgate if the closing procedure could not be completed. In this case, the work carried out by the power strut is reduced by a greater extent than in the preceding closing procedure and/or the distance between the first closing element and the second closing element is increased, in which case the reduction of the torque takes place.

In one embodiment, the first closing element can be designed as a latch plate or can have the form of a fishmouth. Additionally or alternatively thereto, the second closing element can be designed as a latch plate or can have the form of a fishmouth.

The motor vehicle comprises a tailgate, a body, and an above-described device according to the present disclosure. The motor vehicle may have the same properties and advantages, in principle, as the above-described device. The motor vehicle is also suitable for carrying out the above-described method. The motor vehicle can be a passenger car, a truck, a sport utility vehicle, a minivan, a bus, or another type of vehicle.

Further features, properties, and advantages of the present invention are described in greater detail in the following on the basis of exemplary embodiments with reference to the attached figures. All features described above and in the following are advantageous both individually and in any combination with each other. The exemplary embodiments described in the following are merely examples which do not limit the subject matter of the invention, however.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A tailgate of a vehicle, comprising:
   a suspension strut and a power strut arranged on opposite first and second sides of the tailgate;
   a tailgate closing device comprising first and second closing elements on the tailgate and a vehicle body that engage during closing of the tailgate; and
   a controller configured to reduce torque acting via the power strut onto the tailgate during the closing of the tailgate before the first closing element engages the second closing element.

2. The tailgate as claimed in claim 1, wherein the suspension strut is arranged on the first side of the tailgate and on the body of the vehicle and the power strut is arranged on the opposite second side of the tailgate and on the body of the vehicle, wherein the controller reduces the torque when a distance between the first closing element and the second closing element is less than a threshold value.

3. The tailgate as claimed in claim 2, wherein the controller is designed to reduce the torque acting via the power strut onto the tailgate during the closing of the tailgate when the distance between the first closing element and the second closing element is less than 100 millimeters.

4. The tailgate as claimed in claim 2, wherein the controller is designed to reduce the torque acting via the power strut onto the tailgate during the closing of the tailgate when the distance between the first closing element and the second closing element is less than 40 millimeters.

5. The tailgate as claimed in claim 1, wherein the controller is designed to reduce the torque acting via the power strut onto the tailgate during the closing of the tailgate by 90% to 100%.

6. The tailgate as claimed in claim 1, wherein the controller is designed to repeat the closing of the tailgate when the closing procedure could not be completed, wherein at least one of the torque acting via the power strut onto the tailgate is reduced by a greater extent than in the preceding closing procedure and the distance between the first closing element and the second closing element, in which case the reduction of the torque acting via the power strut onto the tailgate takes place, is increased as compared to a preceding closing procedure.

7. The tailgate as claimed in claim 1, wherein the first or the second closing element is designed as a latch plate.

8. The tailgate as claimed in claim 7, wherein the first or the second closing element has the form of a fishmouth.

9. The tailgate as claimed in claim 1, wherein the vehicle is a motor vehicle.

10. A motor vehicle comprising:
    a tailgate;
    a body; and
    a device for automatically closing the tailgate of a motor vehicle, comprising:
       a suspension strut and a power strut arranged on opposite first and second sides of the tailgate;
       a tailgate closing device comprising first and second closing elements on the tailgate and the body that engage during closing of the tailgate; and
       a controller configured to reduce torque acting via the power strut onto the tailgate during the closing of the tailgate before the first closing element engages the second closing element.

11. The motor vehicle as claimed in claim 10, wherein the suspension strut is arranged on the first side of the tailgate and on the body of the vehicle and the power strut is arranged on the opposite second side of the tailgate and on the body of the vehicle, wherein the controller reduces the torque when a distance between the first closing element and the second closing element is less than a threshold value.

12. The motor vehicle as claimed in claim 11, wherein the controller is designed to reduce the torque acting via the power strut onto the tailgate during the closing of the tailgate when the distance between the first closing element and the second closing element is less than 100 millimeters.

13. The motor vehicle as claimed in claim 11, wherein the controller is designed to reduce the torque acting via the power strut onto the tailgate during the closing of the tailgate when the distance between the first closing element and the second closing element is less than 40 millimeters.

14. The motor vehicle as claimed in claim 10, wherein the controller is designed to reduce the torque acting via the power strut onto the tailgate during the closing of the tailgate by 90% to 100%.

15. The motor vehicle as claimed in claim 10, wherein the controller is designed to repeat the closing of the tailgate when the closing procedure could not be completed, wherein at least one of the torque acting via the power strut onto the tailgate is reduced by a greater extent than in the preceding closing procedure and the distance between the first closing element and the second closing element, in which case the reduction of the torque acting via the power strut onto the tailgate takes place, is increased as compared to the preceding closing procedure.

16. A method for automatically closing a tailgate of a motor vehicle which comprises a body and a tailgate closing device, comprising:
    providing the tailgate closing device with a first closing element situated on the tailgate and a second closing element situated on the body of the motor vehicle;
    providing a suspension strut situated on a first side of the tailgate and a power strut situated on a second side of the tailgate, which is opposite the first side, wherein the suspension strut and the power strut are both connected to the tailgate and to the body;
    engaging the first closing element and the second closing element into each other during the closing of the tailgate to effectuate the closure of the tailgate; and
    reducing the torque acting via the power strut onto the tailgate during the closing of the tailgate before the first closing element engages the second closing element when a distance between the first closing element and the second closing element is less than a threshold value.

17. The method as claimed in claim 16, wherein the torque acting via the power strut onto the tailgate is reduced during the closing of the tailgate when the distance between the first closing element and the second closing element is less than 100 millimeters.

18. The method as claimed in claim 16, wherein the torque acting via the power strut onto the tailgate is reduced during the closing of the tailgate when the distance between the first closing element and the second closing element is less than 40 millimeters.

19. The method as claimed in claim 16, wherein the torque acting via the power strut onto the tailgate is reduced during the closing of the tailgate by 90% to 100%.

20. The method as claimed in claim 16, wherein when the closing procedure could not be completed, the closing of the tailgate is repeated, wherein at least one of the torque acting via the power strut onto the tailgate is reduced by a greater extent than in the preceding closing procedure and the distance between the first closing element and the second closing element, in which case the reduction of the torque acting via the power strut onto the tailgate takes place, is increased as compared to the preceding closing procedure.

* * * * *